United States Patent [19]

Wohlrab

[11] 4,443,179

[45] Apr. 17, 1984

[54] RAPID-ACTION MOLD CLOSER

[75] Inventor: Walter Wohlrab, Weissenburg, Fed. Rep. of Germany

[73] Assignee: Krauss-Maffei AG, Munich, Fed. Rep. of Germany

[21] Appl. No.: 348,235

[22] Filed: Feb. 12, 1982

[30] Foreign Application Priority Data

Feb. 25, 1981 [DE] Fed. Rep. of Germany ....... 3107004

[51] Int. Cl.³ .............................................. B29F 1/06
[52] U.S. Cl. ..................................... 425/590; 91/519; 425/451.2; 425/DIG. 223
[58] Field of Search .......... 425/590, 451.2, DIG. 223; 100/269 R; 91/519, 207, 208, 209

[56] References Cited

U.S. PATENT DOCUMENTS

| 2,190,755 | 2/1940 | Dinzl | 91/208 |
| 3,084,512 | 4/1963 | Huelskamp | 425/590 X |
| 3,905,742 | 9/1975 | McCarty | 425/451.2 |

FOREIGN PATENT DOCUMENTS 49-13621  4/1974  Japan ............................ 425/451.2

Primary Examiner—Donald E. Czaja
Assistant Examiner—James C. Housel
Attorney, Agent, or Firm—Karl F. Ross; Herbert Dubno

[57] ABSTRACT

An apparatus for closing a mold in an injection-molding operation has a double-acting main piston that is connected to a mold-carrying plate and that move axially in a main cylinder. A rapid-action piston extends into a small-diameter bore in the main piston, and the rear cylinder wall is formed with a large-diameter fill passage connected directly to a sump. A positioning cylinder is fixed on the main cylinder and contains a positioning piston axially fixed on the rapid-action piston and having in the positioning cylinder a rearwardly directed face larger than the face of the rapid-action piston and forming with the positioning cylinder a pressurizable positioning chamber. A passage extends axially through the rapid-action piston from its cylinder to the positioning chamber. A valve element is fixed axially to the rapid-action and positioning pistons and is displaceable between a rear closed position engaged with and blocking off the fill passage and an open position forward therefrom and exposing the fill passage. Valves connected between the reservoir, pressure source, and chambers serves in a rapid-action closing position to supply fluid under pressure to the positioning chamber while venting the front chamber to the reservoir and thereby moving the positioning piston, rapid-action piston, and valve element forwardly with displacement of the latter into the open position. In a mold-closing position, the valves supply fluid under pressure to the rear chamber while venting the front and positioning chambers for moving the valve element back into the closed position.

10 Claims, 1 Drawing Figure

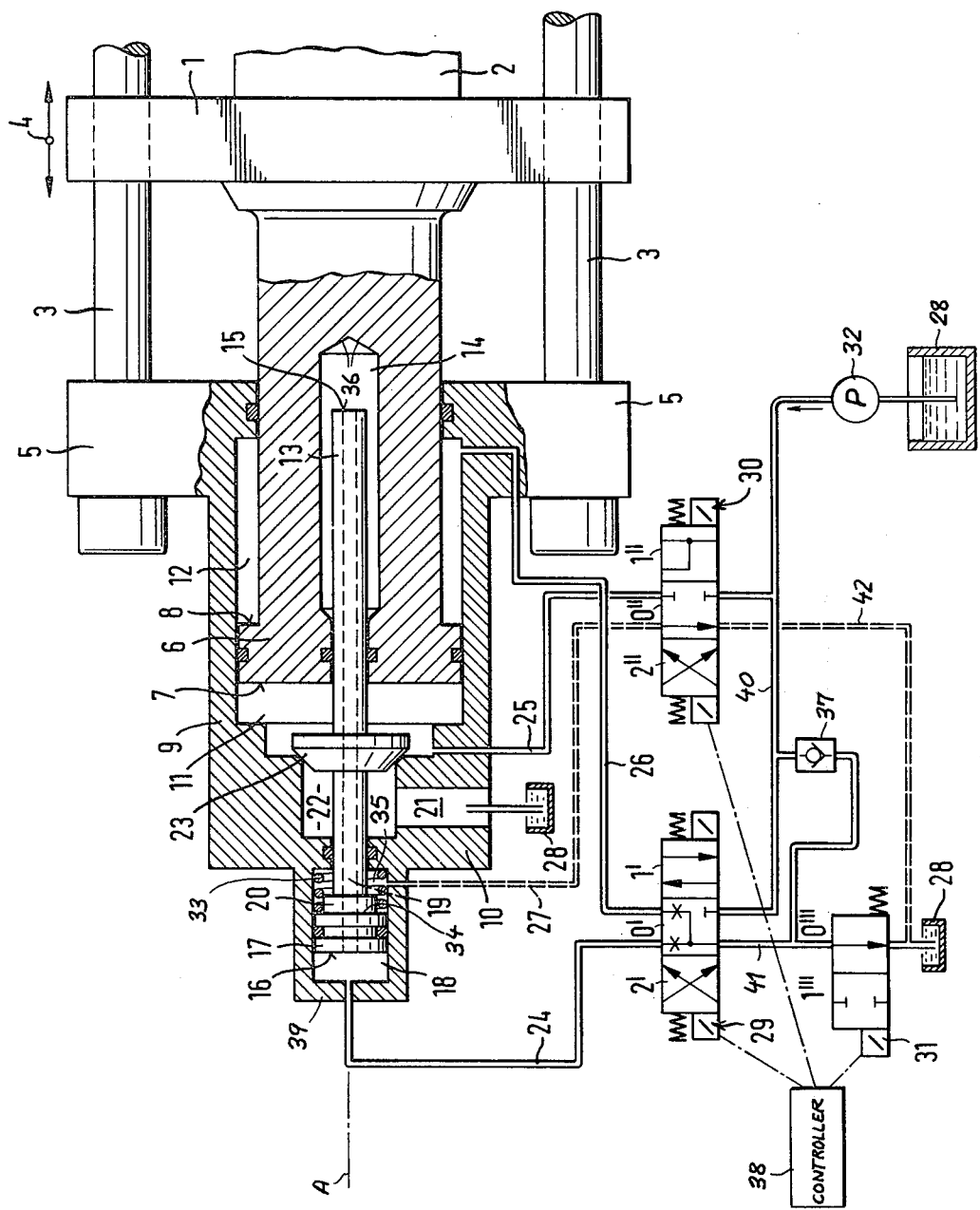

RAPID-ACTION MOLD CLOSER

FIELD OF THE INVENTION

The present invention relates to a rapid-action mold closer of the type used in with an injection-molding machine.

BACKGROUND OF THE INVENTION

An apparatus for closing a mold in an injection-molding operation has a main piston that is connected to a mold-carrying plate and that defines in a main cylinder front and rear main chambers. A so-called rapid-action piston is fixed to and extends as a rod from the rear wall of the main cylinder into a small-diameter bore in the main piston, and this rear wall is formed with a plurality of fill passages connected via respective one-way valves to the sump. A passage extends axially through the rapid-action piston into its cylinder so that fluid under pressure can be fed through this passage into the small-diameter cylinder in the main piston. Obviously fluid at a given pressure will move the main piston much more rapidly when applied to it in the small-diameter rapid-action chamber than in the large rear main chamber, and the rear main chamber can fill rapidly through the several fill passages.

Such an arrangement is disadvantageous in that it requires several fill passages with their own valves to allow sufficient flow into the rear chamber for fast motion of the main piston, and makes rapid-action opening of the mold very complex or impossible. What is more such an arrangement normally requires a battery of expensive hydraulic control valves.

OBJECTS OF THE INVENTION

It is therefore an object of the present invention to provide an improved mold-closing apparatus.

Another object is the provision of such a mold-closing apparatus which overcomes the above-given disadvantages.

A further object is to provide a mold-closing apparatus which is simple and inexpensive, and which allows the mold to be opened and closed in a rapid-action mode.

SUMMARY OF THE INVENTION

These objects are attained according to the instant invention in a mold-closing apparatus for an injection-molding machine of the above-described general type, but wherein the rapid-action piston is not fixed to the rear wall of the main cylinder. A positioning cylinder is fixed on the main cylinder and contains a positioning piston that has in the positioning cylinder a rearwardly directed face larger than the face of the rapid-action piston and forming with the positioning cylinder a pressurizable positioning chamber. The positioning piston is axially fixed on the rapid-action piston which is formed with a piston passage extending between and opening at its face and at the face of the positioning piston. The main cylinder is formed with a large-diameter fill passage opening axially forwardly into its rear chamber. A valve element is fixed axially to the rapid-action and positioning pistons and is displaceable between a rear closed position engaged with and blocking off the fill passage and an open position forward therefrom and exposing the fill passage. A fluid reservoir is directly connected, that is without any valves, to the fill passage. Control means including valves connected between the reservoir, drive means or pressure source, and chambers serves in a rapid-action closing position, to supply fluid under pressure to the positioning chamber while venting the front chamber to the reservoir and thereby moving the positioning piston, rapid-action piston, and valve element forwardly with displacement of the latter into the open position. Thus in this position the rapid-action chamber is pressurized through the passage to move the main piston rapidly forwardly and the rear chamber is connected to the large fill passage to fill rapidly. In a mold-closing position, the control means supplies fluid under pressure to the rear chamber while venting the front and positioning chambers for moving the valve element back into the closed position. Thus in this position the main piston is urged forwardly by pressure in the rear chamber.

Thus with the system of the instant invention a single conduit is pressurized for the rapid-action modes, both during closing and opening. In addition it is possible to use a single fill passage of very large flow cross section, so that even though the main piston is moving inordinately rapidly it can draw in a large volume of fluid. No separate operating means need be provided for the refill valve which automatically opens in the rapid-action modes.

According to another feature of this invention, the control means further includes valve means for, in a mold-opening position, pressurizing the front chamber while venting the rear chamber to the reservoir. The control means further includes valve means for, in a rapid-action opening position, supplying fluid under pressure to the front chamber while blocking flow out of the positioning chamber to move the element into the open position and vent the rear chamber through the fill passage into the reservoir. In this manner fully automatic operation in the rapid-action and standard-action modes is achieved.

In accordance with yet another feature of this invention, the valve fill passage forms an axially centered fill chamber opening axially forwardly into the rear chamber and the valve element is an axially centered plate engageable sealingly over the fill chamber in its the closed position. Such an arrangement allows a very large flow cross section to be opened up, so that fluid can flow unimpeded into the rear chamber, presenting minimal resistance to displacement of the main piston. To this end the main cylinder is formed opening directly into the rear chamber with only one relatively small fill passage that is substantially smaller than the fill passage coverable by the valve element. It is through this small passage that the rear main chamber is pressurized to hold the mold closed during injection and to break it open after molding.

The control means, according to another feature of this invention, includes means for displacing the positioning and rapid-action pistons axially backward. This means can include a spring braced against the positioning piston. It is also possible, when particularly fast action is desired, for this means to include a front positioning chamber between the positioning piston and the main piston and means for pressurizing the front positioning chamber. One of the control valves is provided with an extra port connected to this front positioning chamber to pressurize and depressurize this chamber at the appropriate times.

The integral mechanical unit formed by the positioning piston, rapid-action piston, and valve element further is provided with a stop for limiting forward travel of the positioning and rapid-action pistons and valve element beyond a position corresponding to the open position. This stop eliminates unnecessary travel of these elements beyond a forward travel limit corresponding to a sufficiently great axial spacing between the valve element and the cylinder for rapid flow from the fill passage. This above-described mechanical unit is centered on the axis, the pistons and valve element being bodies of revolution and coaxial. According to this invention the rapid-action piston is formed as a rod extending forwardly through the rear chamber from the positioning piston.

DESCRIPTION OF THE DRAWING

The above and other features and advantages will become more readily apparent from the following, reference being made to the accompanying drawing whose sole FIGURE is a schematic and partially axially sectional view of the apparatus of this invention.

SPECIFIC DESCRIPTION

An injection molding machine has a plate 1 carrying a mold half 2 and slidable in a direction 4 along an axis A on guide rods 3 fixed in a main support 5. A piston 6 carried on and fixed to the plate 1 for joint axial movement therewith has, in an axially extending cylinder 9 formed on the support 5, rear and front piston faces 7 and 8 exposed in respective rear and front chambers 11 and 12.

A rod-shaped rapid-action piston 13 has a front face 15 defining in the piston 6 a rapid-action chamber 14, with the piston face 15 being smaller than the confronting rear face 36 of the piston 6. This rapid-action piston 13 extends axially back out a rear wall 10 of the cylinder 9 and carries a positioning piston 17 having a rear face 16 defining a rear positioning chamber 18 and a front face 34 defining a front positioning chamber 35 in a small-diameter cylinder extension 39 on the rear wall 10. The front positioning-piston face 34 carries a stop 20 that is engageable against the rear wall 10, and a coil compression spring 33 can be braced in the front positioning chamber 35 between the face 34 and the rear wall 10.

The piston 13 is formed with an axially throughgoing passage 19 that opens rearward at the face 16 in the chamber 18 and forward at the face 15 in the chamber 14. In addition this piston 13 carries in the rear chamber 11 a frustoconical valve disk 23 engageable over a fill chamber 22 formed around the stem of the piston 13 in the rear wall 10. A large-diameter fill passage 21 extends from this fill chamber 22 directly to a reservoir or sump 28. This valve element 23 can move forwardly from the illustrated rear position blocking off the chamber 22 from the chamber 11 to a front position allowing fluid communication between these chambers 11 and 22.

A four-port slide-type control valve 29 is connected on one side via a pressurized line 40 to a pump 32 and via a drain line 41 to the sump 28 and on the other side via hydraulic lines 24 and 26 to the chambers 18 and 12, respectively. This valve 29 can be moved by solenoids operated from a controller 38 between three positions 0', 1', and 2'. Another four-port valve 30 is connected on the one side to the high-pressure line 40 of the pump 32 and to a line 42 leading straight to the sump 28 and on the other side via lines 25 and 27 to the chambers 11 and 35, respectively. This valve 30 can slide like the valve 29 between three positions 0", 1", and 2". Finally a two-port valve 31 having two positions 1''' and 0''' is connected in the line 41 between the valve 29 and the sump 28. A check valve 37 is connected between the lines 40 and 41 to prevent the pressure in the line 41 from exceeding that in line 40.

The three valves 29, 30, and 31 between them allow the system to be operated when both opening and closing in the regular mode and in a rapid-action mode.

More particularly the plate 1 is closed, that is moved forwardly or to the right as seen in the drawing, in the rapid-action mode with the valve 29 in position 2', valve 30 in position 2", and valve 31 in position 0'''. This pressurizes the front and rear positioning chambers 18 and 35 by connection to the high-pressure line 40 and vents the front chamber 12 of piston 6 to the sump 28. Since the face 16 of the piston 17 is of greater effective area than the face 34, the piston 17 will move forward, to the right in the drawing, until its stop 20 comes to rest against the cylinder wall 10. This action moves the valve 23 to the forward open position unblocking the fill chamber 22. Once the stop 20 comes against the wall 10, the piston 17 will stop and the fluid under pressure in the chamber 18 will flow through the passage 19 into the chamber 14. The face 36 being larger than the face 15, this pressure will move the piston 6 rapidly forwardly. Such rapid movement is possible because the chamber 11 can fill easily from the chamber 22 through the large-diameter fill passage 21, and because a small volume of fluid is effective for a relatively great displacement when applied in the small cylinder 14.

Once the mold is closed, however, the pressure must be increased considerably. Thus the valve 29 is moved to position 0' and the valve 30 to position 1", the valve 31 remaining in the position 0'''. This vents the rear positioning chamber 18 and the front piston chamber 12 through the valves 29 and 31 to the sump 28. Simultaneously the valve 30 pressurizes both the front positioning chamber 35 to move the piston 17 and valve element 23 back, thereby closing the chambers 22 and 11 off from each other, and the rear piston chamber 11 to urge the piston 6 forwardly. The pressure effective on the much greater surface area of the face 7 will be able to hold the mold closed with enormous force.

In order to open or crack the mold having the half 2 the valve 29 is moved into position 1' and the valve 30 into position 2", with the valve 31 remaining in the position 0'''. The rear positioning chamber 18 and piston chamber 14 are thus depressurized to the sump 28 while the front piston chamber 12 is pressurized by connection through the valve 29 to the high-pressure line 40. The valve 30 meanwhile vents the rear piston chamber 11 while pressurizing the front positioning chamber 35. Thus all pressure is applied toward the rear on the relatively large piston face 8 to break open the mold while all pressure is relieved from the backwardly directed faces 7 and 16.

Once the mold has been thus cracked or opened, the machine of the instant invention can operate in a rapid-action opening mode. To this end the valve 29 is left in position 1', but the valves 30 and 31 are respectively moved into positions 0" and 1'''. This pressurizes the front chamber 12 via the valve 29, but the valve 31 prevents pressure in the rear positioning chamber 18 from escaping, except insofar as it exceeds the pressure in the line 40 in which case it passes through the valve 37. The valve 30 meanwhile blocks off the rear piston chamber 11 via the line 25 and vents the front positioning chamber 35 via the line 27. The pressure on the face 8 will, however, force the piston 6 back, causing pressure to build up in the chamber 14, which pressure will be effective through the passage 19 in the chamber 18. Since the face 16 is of about twice the surface area of the face 15, a differential hydraulic action will move the pistons 13 and 17 forward, thereby moving the valve element 23 also forward to allow the chamber 11 to drain rapidly through the passage 21. The result will be rapid rearward displacement of the piston 6.

It is possible to eliminate the lines 27 and 42 from this system and merely to provide the weak coil spring 33 in the chamber 35, urging the piston 17 rearward. This would allow the four-port three-position valve 30 to be simplified to a two-port three-position valve.

With the system of this invention, therefore, the mold will be moved between the fully open and closed positions in a rapid-action mode in which relatively little force is exerted. Once fully closed, however, considerable force can be brought to bear to hold it closed and to pull it open. The coaxial arrangement of the parts makes the device particularly durable and simple. It can be expected to have a long service life.

I claim:

1. A mold-closing apparatus for an injection-molding machine having a movable mold-carrying plate, said apparatus comprising:

a fixed main cylinder;

a main piston connected to said plate and displaceable in said cylinder along a predetermined axis, said main piston forming in said cylinder a rear chamber and spaced axially toward said plate therefrom a front chamber, whereby pressurizing of said rear chamber with simultaneous depressurizing of said front chamber displaces said piston and plate forward to close a mold;

a rapid-action cylinder formed and extending axially in said main piston;

a rapid-action piston in said rapid-action cylinder and having an axially forwardly directed face forming therein a rapid-action chamber;

a positioning cylinder fixed on said main cylinder;

a positioning piston in said positioning cylinder and having therein a rearwardly directed face larger than said face of said rapid-action piston and forming with said positioning cylinder a pressurizable positioning chamber, said positioning piston being axially fixed on and integral with said rapid-action piston, said rapid-action piston being formed with a piston passage extending between and opening at its said face and at said face of said positioning piston, said main cylinder being formed with a large-diameter fill passage opening axially forward into its said rear chamber;

a valve element integral with and fixed axially to said rapid-action and positioning pistons and displaceable between a rear closed position engaged with and blocking off said fill passage and an open position forward therefrom and exposing said fill passage;

a fluid reservoir connected to said fill passage;

drive means for supplying fluid under pressure; and control means including valves connected between said reservoir, drive means, and chambers for, in a rapid-action closing position, supplying fluid under pressure to said positioning chamber while venting said front chamber to said reservoir and thereby moving said positioning piston, rapid-action piston, and valve element forward with displacement of the latter into said open position, whereby said rapid-action chamber is pressurized through said piston passage to move said main piston rapidly forward and said rear chamber is connected to said large fill passage to fill rapidly, in a mold-closing position, supplying fluid under pressure to said rear chamber while venting said front and positioning chambers for moving said valve element back into said closed position, whereby said main piston is urged forward by pressure in said rear chamber, and in a rapid-action opening position, supplying fluid under pressure to said front chamber while blocking flow out of said positioning chamber to move said element into said open position and vent said rear chamber through said fill passage into said reservoir.

2. The mold-closing apparatus defined in claim 1 wherein said control means further includes valve means for, in a mold-opening position, pressurizing said front chamber while venting said rear chamber to said reservoir.

3. The mold-closing apparatus defined in claim 1 wherein said fill passage forms an axially centered fill chamber opening axially forwardly into said rear chamber and said valve element is an axially centered plate engageable sealingly over said fill chamber in its said closed position.

4. The mold-closing apparatus defined in claim 1 wherein said control means including means for displacing said positioning and rapid-action pistons axially backward.

5. The mold-closing apparatus defined in claim 4 wherein said means for displacing includes a spring braced against said positioning piston.

6. The mold-closing apparatus defined in claim 4 wherein said means for displacing includes a front positioning chamber between said positioning piston and said main piston and means for pressurizing said front positioning chamber.

7. The mold-closing apparatus defined in claim 1, further comprising a stop for limiting forward travel of said positioning and rapid-action pistons and valve element beyond a position corresponding to said open position.

8. The mold-closing apparatus defined in claim 1 wherein said pistons and valve element are bodies of revolution and coaxial.

9. The mold-closing apparatus defined in claim 2 wherein said rapid-action piston is formed as a rod extending forwardly through said rear chamber from said positioning piston.

10. The mold-closing apparatus defined in claim 3 wherein said main cylinder is formed opening directly into said rear chamber with only one relatively small fill passage that is substantially smaller than said fill passage coverable by said valve element.

* * * * *